(12) United States Patent  (10) Patent No.: US 6,443,492 B1
Barr et al.                                  (45) Date of Patent: Sep. 3, 2002

(54) ADJUSTABLE SPRING LOADED MUD FLAP HANGER APPARATUS

(75) Inventors: Graylin Patrick Barr, Fresno; Jay Ford, Madera, both of CA (US)

(73) Assignee: Betts Spring Company, Fresno, CA (US)

( * ) Notice: Subject to any disclaimer, the term of this patent is extended or adjusted under 35 U.S.C. 154(b) by 0 days.

(21) Appl. No.: 09/795,785

(22) Filed: Feb. 27, 2001

(51) Int. Cl.$^7$ ................................................ B62B 9/14
(52) U.S. Cl. ........................ 280/851; 280/852; 280/159; 280/160
(58) Field of Search .................. 280/152.05, 152.1, 280/152.2, 152.3, 153.5, 154, 159, 160, 847, 852, 851, 848, 849, 850

(56) References Cited

U.S. PATENT DOCUMENTS

| 1,094,134 | A |   | 4/1914  | Dickerson |            |
|-----------|---|---|---------|-----------|------------|
| 3,401,953 | A | * | 9/1968  | Prohl     | 280/154.5  |
| 3,934,901 | A |   | 1/1976  | Hammerly  |            |
| 3,954,281 | A | * | 5/1976  | Jergens   | 280/154.4  |
| 4,007,944 | A | * | 2/1977  | Dingess   | 280/154.4  |
| 4,165,092 | A |   | 8/1979  | Herlein   |            |
| 4,453,728 | A | * | 6/1984  | Verge     | 280/154.5  |
| 4,541,646 | A |   | 9/1985  | Knowley   |            |
| 4,856,816 | A |   | 8/1989  | Francis   |            |
| 5,833,254 | A |   | 11/1998 | Bucho     |            |

* cited by examiner

*Primary Examiner*—Jack Lavinder
*Assistant Examiner*—C. T. Bartz
(74) *Attorney, Agent, or Firm*—Thomas R. Lampe

(57) ABSTRACT

A mud flap hanger incorporates a tension spring within a mud flap support member of the hanger which can be tensioned from a location external of the support member. The apparatus includes a connector projecting from the support member threadedly connected to a tensioner nut which is rotated to tension the spring. A stop on the connector engages an end of the support member to limit the tension that can be applied to the tension spring.

10 Claims, 4 Drawing Sheets

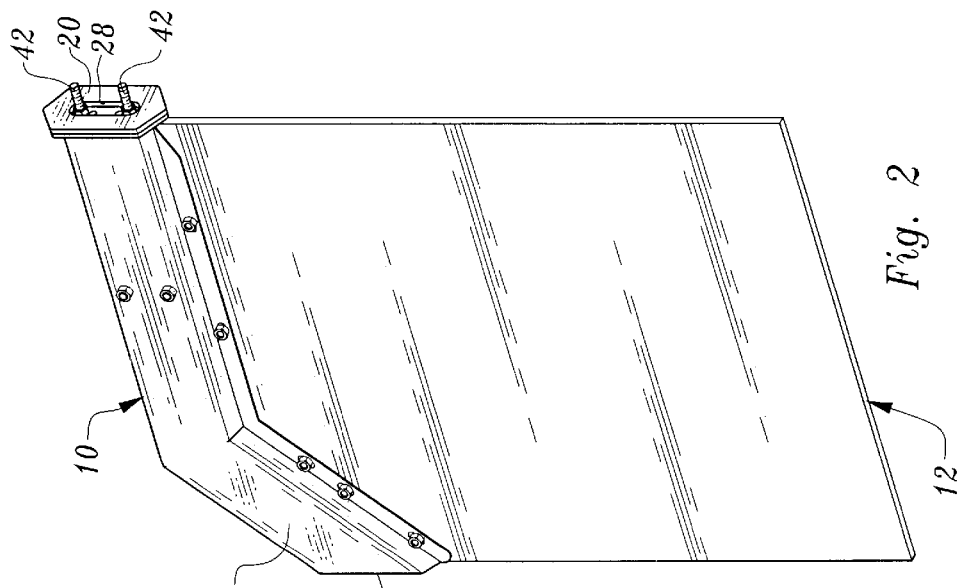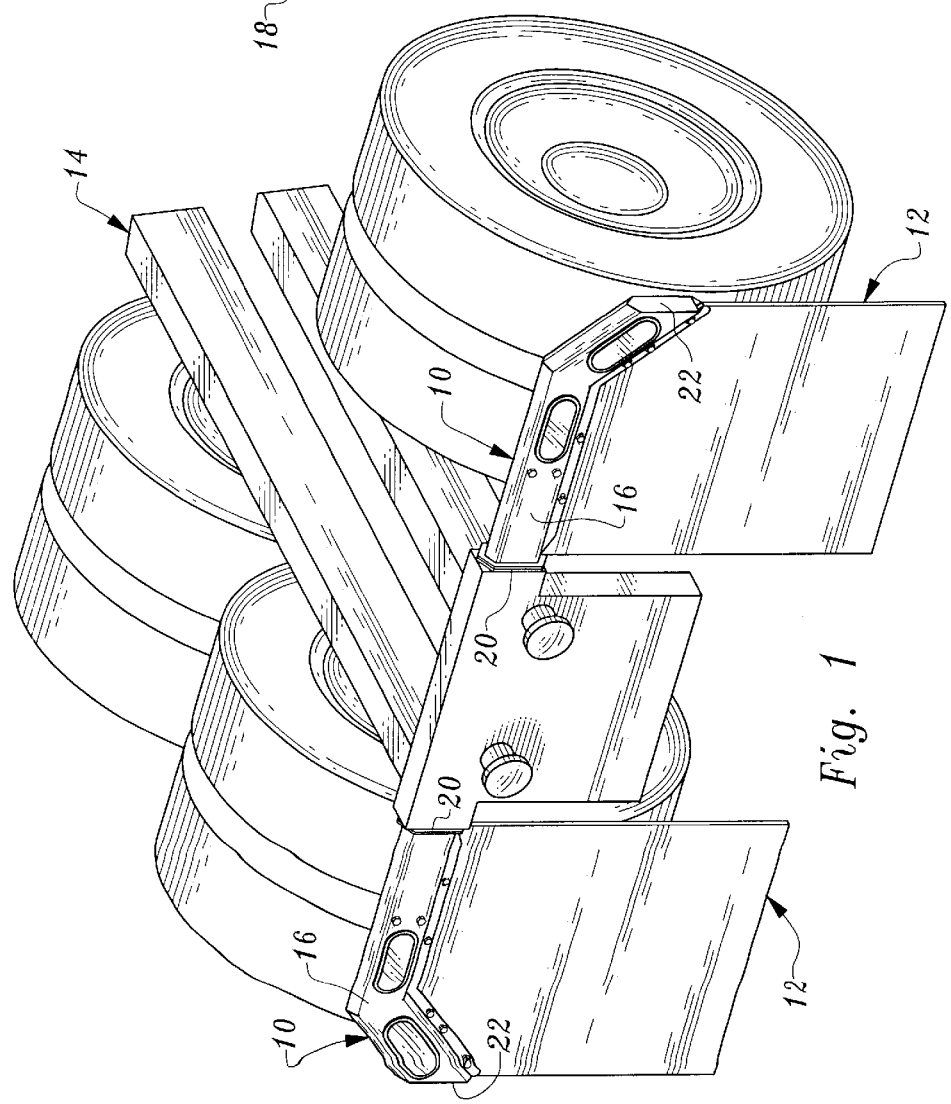

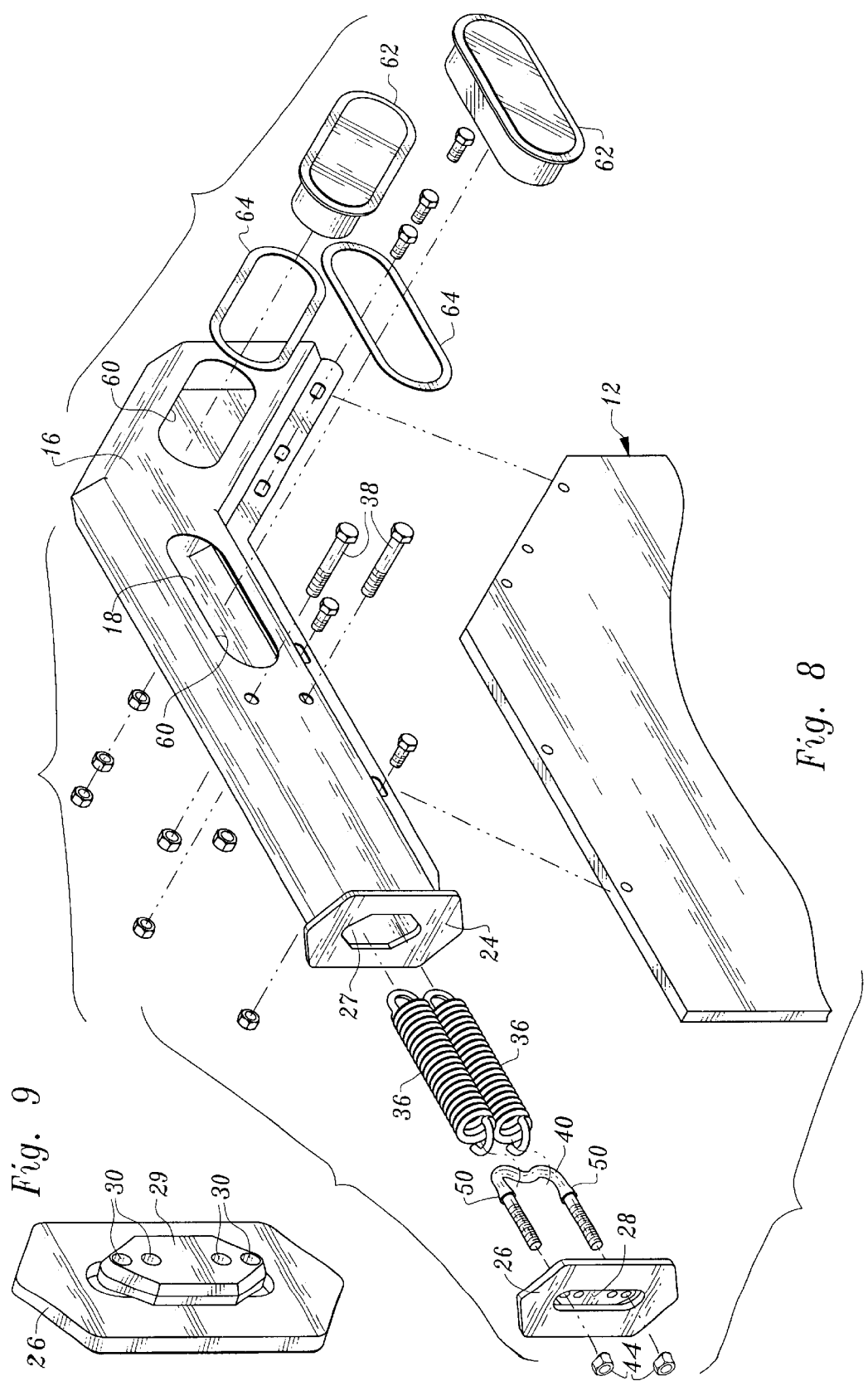

ADJUSTABLE SPRING LOADED MUD FLAP HANGER APPARATUS

TECHNICAL FIELD

This invention relates to mud flap hanger apparatus for securement to a truck or other vehicle. More particularly, the hanger apparatus is of the spring loaded type.

BACKGROUND OF THE INVENTION

Flap hangers on heavy duty trucks are exposed to significant abuse in service. Strikes by road debris, tangling with trailer components, or accidents all can result in bending or breaking of the hanger structure. Spring loaded mud flap hangers have been developed to resist this type of damage by allowing the hanger to flex when impacted.

Existing spring loaded flap hangers typically employ one or two large internal springs, which are disposed in the interior of a formed and welded sheet metal portion from which the mud flap hangs known as a shroud. These products are usually supplied to the customer with the spring or springs in a pretensioned condition. Conventionally, installed spring tensional forces typically are in the range of 3200 N to 3660 N. Normally, these springs are tensioned during manufacture by special machines and jigs.

All mechanical springs have elastic limits. A common problem during service is deflection of the flap hanger beyond the elastic limit of the spring or springs. This condition results in loss of tension, which in turn causes the hanger to become loose on the vehicle. The hanger may then allow the flap to contact the road surface or even become completely separated from the truck. Correcting this condition requires replacement of the spring or replacement of the entire hanger assembly, which can be several times the cost of the spring.

Unless the user invests several thousand dollars in special assembly equipment, these powerful springs, typically coil tension springs, must be tensioned by improvised methods. These include employing fence pullers, forklifts and the like with ropes or cables. It is also known to simply pull the springs into stretched condition by employing several persons. These methods not only can be dangerous, but carry the risk of over extending and ruining the spring on installation. These are labor intensive, expensive repairs regardless of the method used.

A search located the following U.S. Patents: U.S. Pat. No. 1,094,134, issued Apr. 21, 1914; U.S. Pat. No. 4,165,092, issued Aug. 21, 1979, U.S. Pat. No. 4,541,646, issued Sep. 17, 1985; U.S. Pat. No. 4,856,816, issued Aug. 15, 1989; U.S. Pat. No. 5,833,254, issued Nov. 10, 1998, and U.S. Pat. No. 3,934,901, issued Jan. 27, 1976.

These patents do not disclose or suggest the invention disclosed and claimed herein.

DISCLOSURE OF INVENTION

The present invention relates to spring loaded mud flap hanger apparatus for a vehicle which allows spring replacement and tensioning to be readily accomplished. Installation of the hanger system of the present invention is inherently safer than is the case with respect to prior art spring loaded systems. The spring cannot be over-extended during installation.

The mud flap hanger apparatus of the present invention allows the use of tension springs having either partially open or completely closed end loops, the latter reducing the possibility of total loss of the hanger in service. Prior art assemblies require use of springs having end loops with gaps formed therein for installation.

The mud flap hanger apparatus of the present invention is for securement to a truck or other vehicle.

The apparatus includes a mud flap support member having an attachment end and a distal end spaced from the attachment end.

A tension spring having first and second ends is attached at the first end thereof to the mud flap support member at a location spaced from said attachment end.

A connector is connected to the second end of the tension spring and includes a threaded connector portion projecting outwardly from the attachment end of the mud flap support member.

A tension adjustment member is threadedly engaged with the outwardly projecting threaded connector portion and is cooperable with the connector and the mud flap support member to tension the tension spring from a location external of the mud flap support member.

Securement means is provided for securing the mud flap hanger apparatus to a vehicle.

Other features, advantages, and objects of the present invention will become apparent with reference to the following description and accompanying drawings.

BRIEF DESCRIPTION OF DRAWINGS

FIG. 1 is a perspective view of the rear end of a truck trailer having two mud flap hangers constructed in accordance with the teachings of the present invention secured thereto and supporting two mud flaps;

FIG. 2 is a perspective view of the mud flap hanger apparatus detached from a vehicle and connected to a mud flap;

FIG. 8 is an exploded, perspective view illustrating components of the embodiment of FIGS. 1–6 prior to assembly thereof with a mud flap, only a portion of the latter being illustrated in this figure; and FIG. 9 is a perspective view of a component of the attachment end of the apparatus mud flap support member.

MODES FOR CARRYING OUT THE INVENTION

Figure 3:
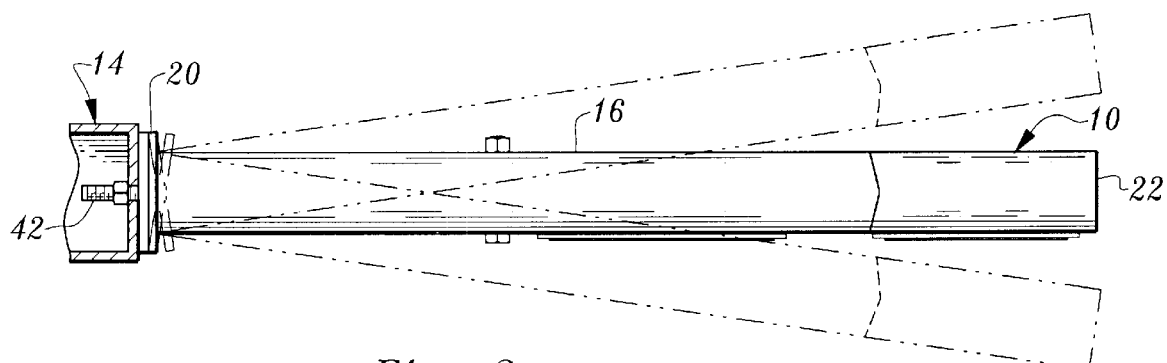
FIG. 3 is a top plan view of the mud flap hanger apparatus attached to vehicle structure and illustrating in solid lines the normal position of the hanger apparatus and in dash lines two alternate positions which may be attained by the hanger apparatus upon deflection.

Referring now to FIGS. 1–6 and 8, a preferred form of hanger apparatus constructed in accordance with the teachings of the present invention is illustrated. The hanger apparatus is identified by reference numeral 10 and the apparatus is for the purpose of holding a mud flap 12. FIG. 1 shows two such assemblies secured to the rear of a truck trailer 14.

Apparatus 10 includes an elongated mud flap support member 16 in the nature of a shroud defining an interior 18 and preferably formed of metal. The support member 16 has an attachment end 20 and a distal end 22 spaced from the attachment end.

The attachment end 20 is suitably comprised of two plates 24, 26 abutting in face to face relationship. Plate 24 is welded or otherwise secured to the elongated component of the shroud and includes an aperture 27. Plate 26 defines a recess 28 and openings 30, the openings communicating with the interior 18 of the support member when a protruding portion 29 of the plate is positioned in aperture 27. Protruding portion 29 is welded to the rest of plate 26. In the arrangement illustrated, there are four openings 30.

Located in interior 18 of the support member or shroud 16 are two double-ended coil tension springs 36. The inner loop ends of the springs 36 are disposed about bolts 38 extending through the shroud interior and attached to the shroud by nuts. The bolts attach the springs to the support member between the attachment end and the distal end thereof.

The outer looped ends of the springs 36 receive a U-bolt 40. The threaded leg portions 42 of the U-bolt pass through the two outermost openings 30 in the attachment end 20 and through recess 28 as well. The portion of the U-bolt between the threaded leg portions has two bights formed therein to maintain spacing between the connected inner loop ends of the springs 36. In the arrangement illustrated, the looped ends of springs 36 define a gap but the apparatus can readily employ springs with closed loop ends as well.

Figure 5A:
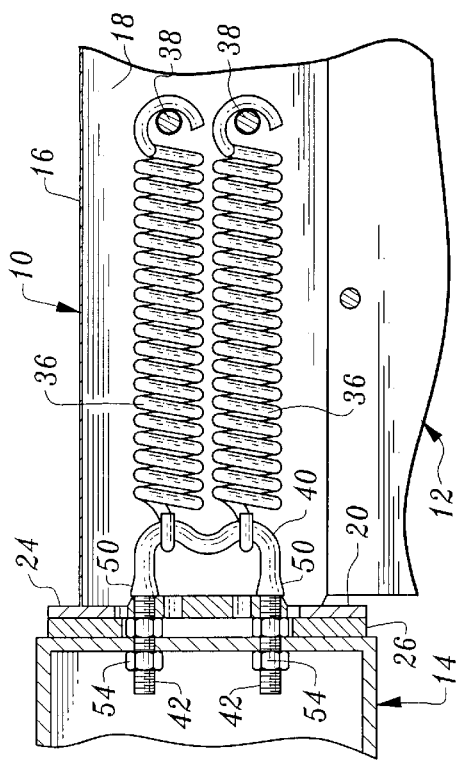
FIG. 5A is an elevational view, taken in partial cross-section, of a portion of the hanger, including a U-bolt and two coil springs, prior to tensioning of the springs.

Tensioner nuts 44 are threadedly engaged with the outwardly projecting threaded leg portions 42 and the tensioner nuts 44 are located in the recess 28. The tensioner nuts 44 are accessed outside the shroud or support member 16 so that they can be turned by a conventional tool relative to the U-bolt threaded leg portions to tension the springs 36. FIG. 5A shows the components prior to tensioning of the springs.

Figure 5B:
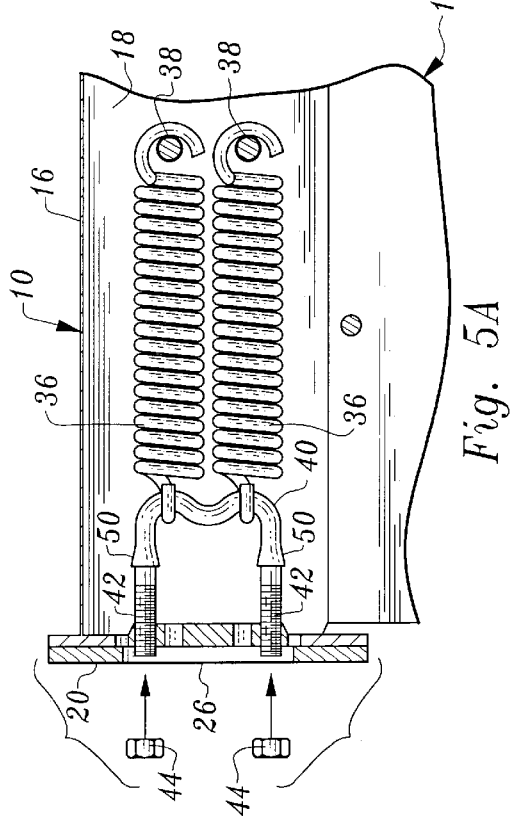
FIG. 5B is a view similar to FIG. 5A but illustrating the hanger apparatus with the springs tensioned and prior to attachment of the hanger apparatus to vehicle structure.

It is to be noted that protrusions or stop means 50 are formed on the legs of the U-bolt. The nuts 44 are turned until the protrusions 50 engage the inner bearing surface of plate 24 of the attachment end 20 as shown in FIG. 5B. When engagement of the protrusions 50 and the attachment end takes place the springs 36 are properly tensioned. Since the nuts 44 can not be turned further, the springs cannot be over tensioned. When the structure is in the condition shown in FIG. 5B, the tensioner nuts 44 bear against the outer bearing surface of plate 24 of the attachment end (within recess 28) while the protrusions 50 bear against the inner bearing surface of plate 24 thereof. Plates 24, 26 are maintained in face to face engagement due to forces exerted by springs 36.

Figure 6:
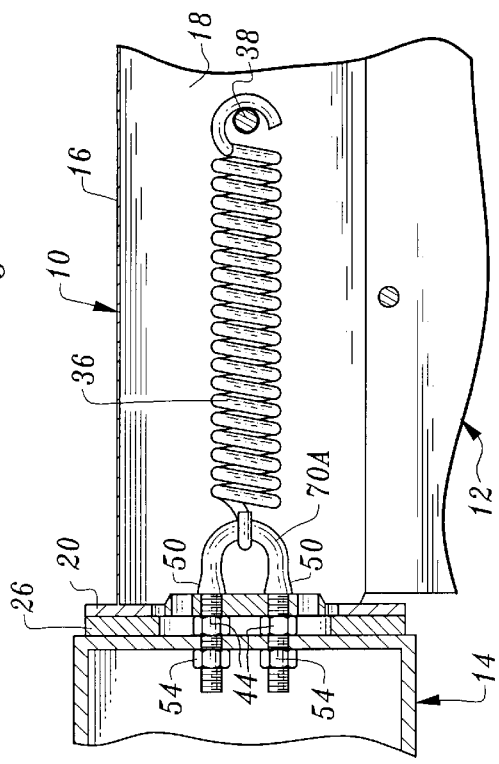
FIG. 6 is an elevation view in partial cross-section illustrating the hanger apparatus secured to the vehicle structure with the springs tensioned.

The assembly is now in condition for attachment to the vehicle 14. In particular, attachment is accomplished by passing the U-bolt leg portions through openings 52 formed in the vehicle structure and employing securement nuts 54 threaded to the leg portions 42 of the U-bolt to secure the mud flap hanger apparatus to the vehicle. FIG. 6 shows the assembly fully secured to the vehicle. The threaded securement nuts 54 are spaced from the tensioner nuts 44 with the vehicle structure disposed therebetween.

Figure 4:
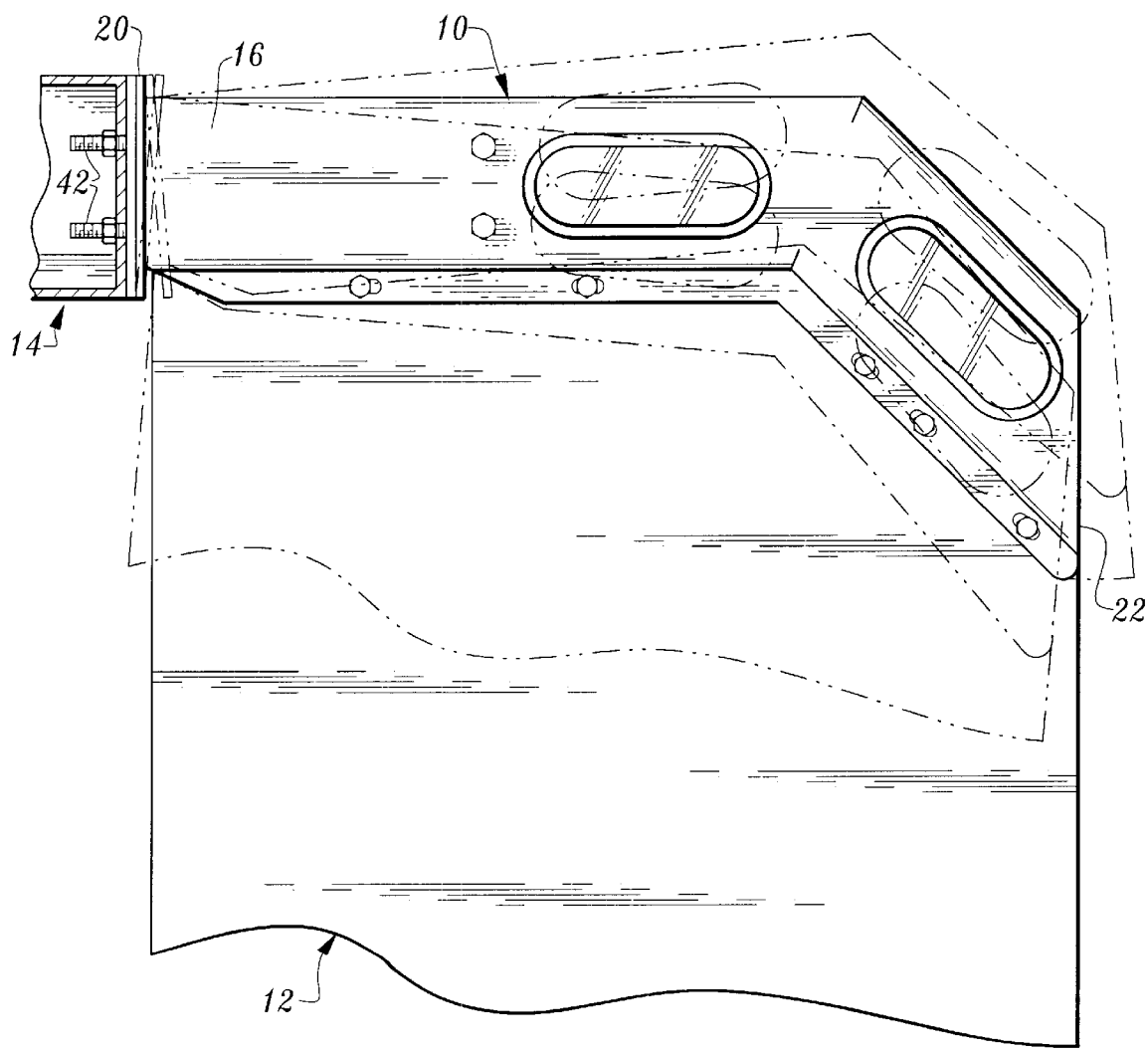
FIG. 4 is an elevational view of the mud flap hanger apparatus attached to vehicle structure and illustrating deflection of the hanger apparatus and mud flap associated therewith to two alternate positions, shown in dash lines, when deflected from the normal position, shown in solid lines.

The plate 26 of attachment end 20 of the mud flap hanger apparatus bears against the engaged flat portion of the vehicle structure. The springs 36 allow the mud flap hanger apparatus to deflect relative to the vehicle as shown in FIGS. 3 and 4 when impacted or when other outside forces are applied to the mud flap hanger apparatus.

It will be appreciated that installation and removal of the springs 36 is readily accomplished and that the installation procedure as well as the tensioning of the springs can be carried out from a location external of the shroud or support member 16. Springs 36 and the U-bolt can readily pass through aperture 27 of the plate 24 when the apparatus is disassembled.

In the arrangement illustrated, holes 60 are formed in a side of the support member for receiving red lights 62 which are associated therewith. Grommets 64 are utilized to form a seal between the support member and the lights. Threaded fasteners are utilized to secure the lights to the support member and also to secure the mud flap 12 in place relative to the support member.

Figure 7:
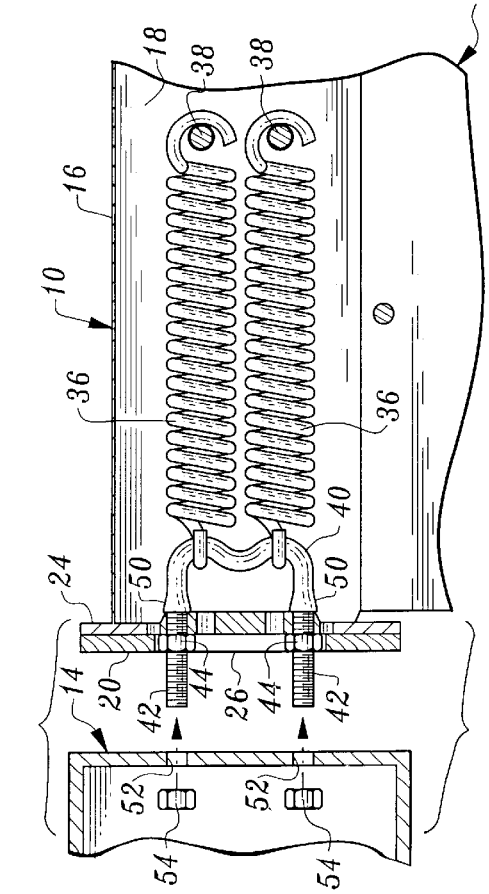
FIG. 7 is a view similar to FIG. 6 but illustrating an alternate embodiment of the invention incorporating only one coil tension spring.

FIG. 7 shows an alternate embodiment of the invention incorporating a smaller U-bolt 70A and only a single spring 36. The threaded leg portions of the U-bolt 70A extend through the inner set of openings 30 in the attachment end of the mud flap support member.

The invention claimed is:

1. Mud flap hanger apparatus for securement to a truck or other vehicle, said mud flap hanger apparatus comprising, in combination:

a mud flap support member having an attachment end and a distal end spaced from said attachment end;

a tension spring having first and second ends, said tension spring attached at the first end thereof to said mud flap support member at a location spaced from said attachment end;

a connector connected to the second end of said tension spring and including a threaded connector portion projecting outwardly from the attachment end of said mud flap support member;

a tension adjustment member threadedly engaged with said outwardly projecting threaded connector portion and cooperable with said connector and said mud flap support member to tension said tension spring from a location external of said mud flap support member; and securement means for securing said mud flap hanger apparatus to a vehicle, said connector being movably mounted relative to said mud flap support member and movable relative to said mud flap support member during tensioning of said tension spring, said mud flap hanger apparatus additionally comprising stop means for limiting relative movement between said connector and said mud flap support member and limiting the degree to which said tension spring can be tensioned, said stop means comprising a protrusion projecting from said connector and disposed adjacent to and inwardly of the attachment end of said mud flap support member.

2. The mud flap hanger apparatus according to claim 1 wherein said mud flap support member defines an interior accommodating said double-ended tension spring and wherein said attachment end defines an opening communicating with said interior, said connector extending through said opening, said attachment end having an inner bearing surface and an outer bearing surface, and said protrusion bearing against said inner bearing surface when said tension spring is under tension.

3. The mud flap hanger apparatus according to claim 2 wherein said tension adjustment member comprises a tensioner nut threadedly engaged with the threaded portion of said connector, said tensioner nut bearing against said outer bearing surface when said tension spring is under tension.

4. The mud flap hanger apparatus according to claim 3 wherein said attachment end defines a recess accommodating said tensioner nut.

5. The mud flap hanger apparatus according to claim 3 wherein said securement means includes a securement nut engaged with the threaded portion of said connector and spaced from said tensioner nut.

6. The mud flap hanger apparatus according to claim 1 wherein said double-ended tension spring is a coil spring.

7. The mud flap hanger apparatus according to claim 1 comprising at least one additional tension spring attached to said spring attachment structure and to said connector.

8. Mud flap hanger apparatus for securement to a truck or other vehicle, said mud flap hanger apparatus comprising, in combination:

a mud flap support member defining an interior and having an attachment end and a distal end spaced from said attachment end, said attachment end defining an opening communicating with said interior;

a tension spring located in said interior and attached to said mud flap support member;

a threaded connector connected to the said tension spring and extending through said opening, said threaded connector for connection to a vehicle and including a threaded connector portion projecting outwardly from said mud flap support member;

tension adjustment means operatively associated with said mud flap support member and with said threaded connector and accessible from outside the mud flap support member for adjusting the distance said threaded connector portion projects from said mud flap support member and for adjusting the tension of said tension spring; and tension limiting means for limiting the distance said threaded connector portion projects from said mud flap support member and the degree to which said tension spring can be tensioned by said tension adjustment means, said tension limiting means including a protrusion formed on said threaded connector engageable with the attachment end of said mud flap support member.

9. Mud flap hanger apparatus for securement to a truck or other vehicle, said mud flap hanger apparatus comprising, in combination:

a mud flap support member having an attachment end and a distal end spaced from said attachment end;

a tension spring having first and second ends, said tension spring attached at the first end thereof to said mud flap support member at a location spaced from said attachment end;

a connector comprising a U-bolt connected to the second end of said tension spring and including a threaded connector portion projecting outwardly from the attachment end of said mud flap support member;

a tension adjustment member threadedly engaged with said outwardly projecting threaded connector portion and cooperable with said connector and said mud flap support member to tension said tension spring from a location external of said mud flap support member; and securement means for securing said mud flap hanger apparatus to a vehicle.

10. Mud flap hanger apparatus for securement to a truck or other vehicle, said mud flap hanger apparatus comprising, in combination:

a mud flap support member having an attachment end and a distal end spaced from said attachment end;

a tension spring having first and second ends, said tension spring attached at the first end thereof to said mud flap support member at a location spaced from said attachment end;

a connector connected to the second end of said tension spring and including a threaded connector portion projecting outwardly from the attachment end of said mud flap support member;

a tension adjustment member threadedly engaged with said outwardly projecting threaded connector portion and cooperable with said connector and said mud flap support member to tension said tension spring from a location external of said mud flap support member; and securement means for securing said mud flap hanger apparatus to a vehicle, said attachment end including first and second plates in face to face engagement and maintained in face to face engagement by the force exerted by said tension spring.

\* \* \* \* \*